(12) United States Patent
Kataoka

(10) Patent No.: US 12,216,444 B2
(45) Date of Patent: Feb. 4, 2025

(54) CONTROL DEVICE, CONTROL SYSTEM, AND MANAGEMENT METHOD

(71) Applicant: OMRON Corporation, Kyoto (JP)

(72) Inventor: Hitoshi Kataoka, Kyoto (JP)

(73) Assignee: OMRON CORPORATION, Kyoto (JP)

(*) Notice: Subject to any disclaimer, the term of this patent is extended or adjusted under 35 U.S.C. 154(b) by 310 days.

(21) Appl. No.: 17/702,983

(22) Filed: Mar. 24, 2022

(65) Prior Publication Data

US 2022/0326677 A1    Oct. 13, 2022

(30) Foreign Application Priority Data

Apr. 12, 2021    (JP) .................................. 2021-067106

(51) Int. Cl.
| | |
|---|---|
| G05B 19/05 | (2006.01) |
| G06F 21/51 | (2013.01) |
| G06F 21/57 | (2013.01) |

(52) U.S. Cl.
CPC ......... G05B 19/058 (2013.01); G05B 19/056 (2013.01); *G05B 2219/24024* (2013.01); *G05B 2219/24167* (2013.01); *G06F 21/51* (2013.01); *G06F 21/57* (2013.01)

(58) Field of Classification Search
CPC ................ G05B 19/058; G05B 19/056; G05B 2219/24024; G05B 2219/24167; G06F 21/51; G06F 21/57
See application file for complete search history.

(56) References Cited

U.S. PATENT DOCUMENTS

| | | | | |
|---|---|---|---|---|
| 2013/0091346 A1* | 4/2013 | Condorelli | ............ | G06F 9/4403 713/2 |
| 2013/0245792 A1* | 9/2013 | Anzai | ..................... | H04L 41/28 700/87 |
| 2016/0239662 A1* | 8/2016 | Endoh | ..................... | G06F 21/12 |
| 2017/0060784 A1* | 3/2017 | Sisler | ..................... | H04L 67/125 |
| 2017/0262278 A1* | 9/2017 | Takuma | ................... | G06F 8/71 |
| 2017/0300027 A1 | 10/2017 | Oyama et al. | | |
| 2018/0121651 A1* | 5/2018 | Kim | ..................... | G06F 16/1873 |

(Continued)

FOREIGN PATENT DOCUMENTS

| | | |
|---|---|---|
| JP | 2008-065678 A | 3/2008 |
| JP | 2015-18930 A | 1/2015 |

(Continued)

OTHER PUBLICATIONS

Extended European Search Report dated Aug. 23, 2022 in European Application No. 22164033.7.

(Continued)

*Primary Examiner* — Daniel Samwel
(74) *Attorney, Agent, or Firm* — Sughrue Mion, PLLC

(57) ABSTRACT

A control device can modify a first user program and first setting information in the storage unit executed by a control engine respectively using a second user program and second setting information received by the control device. A security engine of the control device verifies identity between the first user program and the second user program, evaluates the validity of setting indicated by the second setting information, and permits or prohibits performance of the above modification based on such a verification result and the evaluation.

13 Claims, 13 Drawing Sheets

(56) References Cited

U.S. PATENT DOCUMENTS

| | | | |
|---|---|---|---|
| 2018/0365423 A1* | 12/2018 | Poppe | ................... G05B 19/00 |
| 2020/0125060 A1 | 4/2020 | Fujimura | |
| 2020/0159194 A1* | 5/2020 | Katsumata | ......... G05B 19/4189 |
| 2022/0085982 A1 | 3/2022 | Muneta et al. | |
| 2022/0100162 A1 | 3/2022 | Nagata | |
| 2022/0147632 A1 | 5/2022 | Tahara et al. | |

FOREIGN PATENT DOCUMENTS

| | | |
|---|---|---|
| JP | 2017-75500 A | 4/2017 |
| JP | 2017-167588 A | 9/2017 |
| JP | 2017-198162 A | 11/2017 |
| JP | 2020-161048 A | 10/2020 |
| WO | 2020/158247 A1 | 8/2020 |
| WO | 2020/175031 A1 | 9/2020 |

OTHER PUBLICATIONS

Japanese Office Action dated Jul. 16, 2024 in Application No. 2021-067106.

* cited by examiner

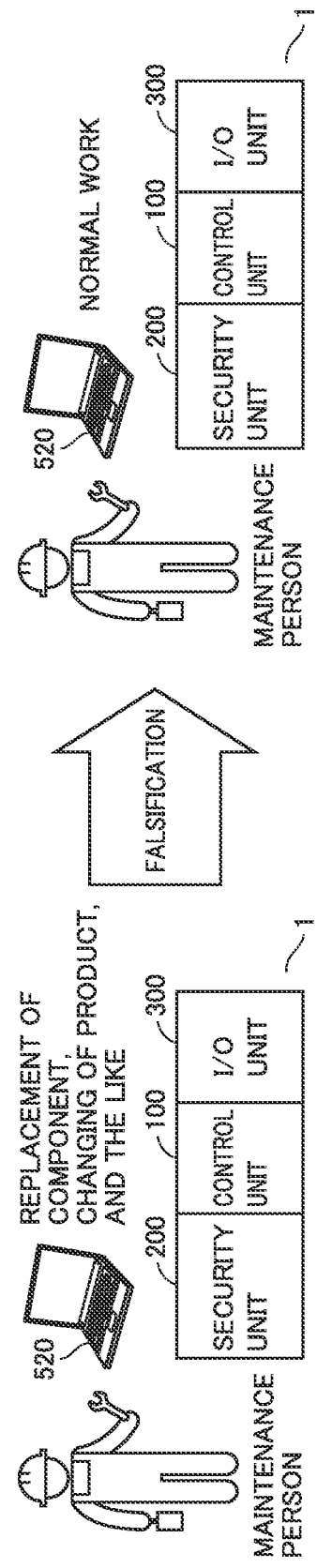

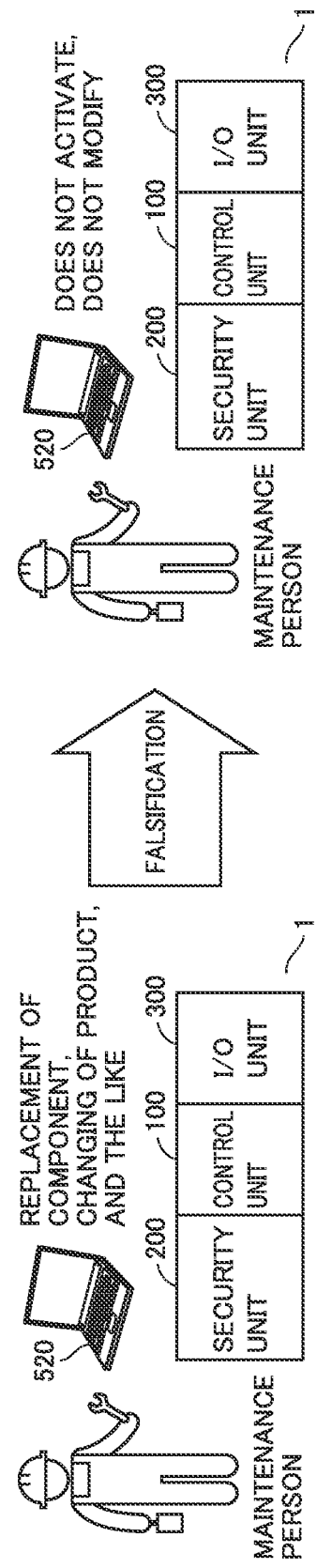

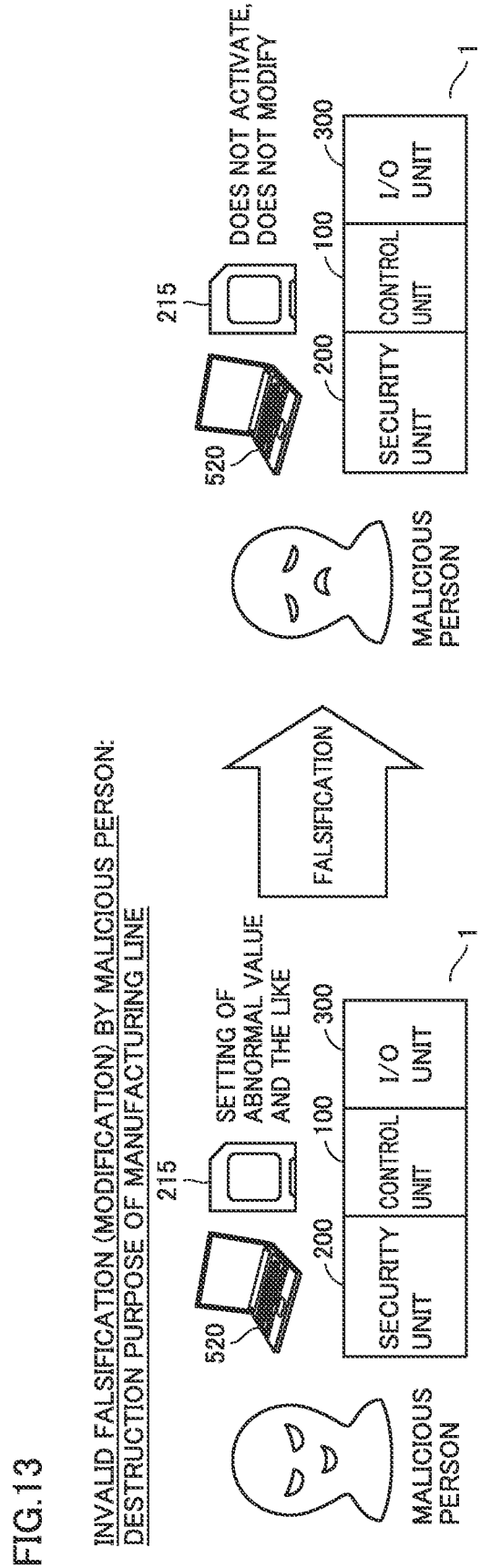

CONTROL DEVICE, CONTROL SYSTEM, AND MANAGEMENT METHOD

This nonprovisional application is based on Japanese Patent Application No. 2021-067106 filed on Apr. 12, 2021 with the Japan Patent Office, the entire contents of which are hereby incorporated by reference.

BACKGROUND OF THE INVENTION

Field of the Invention

The present disclosure relates to a control device, a control system, and a management method.

Description of the Background Art

A control device such as a programmable logic controller (PLC) is introduced in various manufacturing sites. The control device is a kind of computer, and executes a control program designed according to a control target such as a manufacturing device or a manufacturing facility based on setting information including a control parameter.

In recent years, an IoT of the control devices has progressed, and an environment in which a control device can be connected to an external device such as the Internet or a cloud or an external network has been provided. In such an environment, because the control program of the control device can be rewritten by the external device, a serious incident may be caused when the rewriting is a malicious falsification.

Japanese Patent Laying-Open No. 2008-065678 discloses one method for dealing with such a risk. Specifically, Japanese Patent Laying-Open No. 2008-065678 discloses a method in which a PLC determines whether or not a program obtained by encrypting a control program is a program unique to a facility equipment, decrypts the control program from the program when the program is unique to the facility equipment, and executes the control program to control the facility equipment.

SUMMARY OF THE INVENTION

In the method disclosed in Japanese Patent Laying-Open No. 2008-065678, the PLC includes storage means for storing identification data and an encryption rule that are previously input, and determines whether or not the encrypted program is the program unique to the facility equipment using the identification data. When determining that the encrypted program is a program unique to the facility equipment, the PLC obtains the control program by decrypting the encrypted program according to the encryption rule, and uses the control program. For this reason, the identification data and the encryption rule are required to be prepared in order to protect the control program from the malicious falsification, namely, in order to allow only the bona fide falsification by a legitimate user, which puts a burden on the user.

The present disclosure provides a mechanism capable of securing security of the control device while reducing the burden on the user.

A control device according to an example of the present disclosure includes: a storage unit configured to store a first user program for control of a target and first setting information indicating a setting for the control; a reception unit configured to receive a second user program for the control of the target and second setting information indicating the setting for the control; a modifying unit configured to modify the first user program and the first setting information of the storage unit respectively using the second user program and the second setting information; a control engine configured to execute the first user program using the first setting information; and a security engine configured to manage security of the first setting information and the first user program. The security engine includes: a program verification unit configured to verify whether or not the first user program and the second user program satisfy program identity; an evaluation unit configured to evaluate validity of the setting indicated by the second setting information; and a modifying controller configured to permit or prohibit performance of the modifying of the modifying unit from a verification result of the program verification unit and an evaluation of the evaluation unit.

According to an example of the above disclosure, when the first user program and the first setting information in the storage unit executed by the control engine are modified respectively using the received second user program and second setting information, the security engine verifies the identity of the first user program and the second user program, evaluates the validity of the setting indicated by the second setting information, and permits or prohibits the performance of the above modification based on the verification result and the evaluation.

Consequently, the prohibition or permission of the modifying of the first user program and the first setting information executed by the control engine can be controlled without requiring special input by the user. As a result, occurrence of an incident due to inappropriate falsification of the control program or the setting information can be avoided while the burden on the user is reduced, and the security of the control device can be secured.

In the example of the above disclosure, the evaluation unit includes a checking unit configured to check whether or not the second setting information satisfies a constraint condition for the control of the target.

According to the example of the above disclosure, the evaluation of the validity of the setting indicated by the second setting information can be implemented by checking whether or not the second setting information satisfies the constraint condition for the control of the target.

In the example of the above disclosure, the control device further permits or prohibits the performance of the modifying based on time information indicated by production plan information including a set-up change time of a manufacturing line including the target.

According to an example of the above disclosure, the occurrence of the incident due to the falsification of the control program or the setting information completely independently of the production plan information can be prevented.

In an example of the above disclosure, the program verification unit generates a program verification code verifying identity of the program from each of the first user program and the second user program, and verifies the identity based on collation between the program verification codes.

According to an example of the above disclosure, the verification of the program can be performed using the verification code that can be generated from each program itself.

In an example of the above disclosure, the program verification code includes hash values each generated from the first user program and the second user program.

According to an example of the above disclosure, the hash value can be used as the verification code.

In the example of the above disclosure, the hash value generated from the second user program is stored as a hash value of the modified first user program when the modification is performed by the modifying unit.

According to the example of the above disclosure, the hash value generated from the second user program for the verification is stored as the hash value of the modified first user program when the modification is performed by the modifying unit. Thus, in the subsequent verification, the stored hash value can be used without generating the hash value from the first user program.

In an example of the above disclosure, the control device includes: a security unit that includes the security engine; and a control unit that is independent of the security unit and has the control engine.

According to an example of the above disclosure, the security engine can be provided as a unit independent of the control unit of the control engine.

According to another example of the present disclosure, a control system comprises a plurality of the control devices connected to a network. Each control device comprises a storage unit configured to store a first user program for control of a target and first setting information indicating a setting for the control, a reception unit configured to receive a second user program for the control of the target and second setting information indicating the setting for the control, a modifying unit configured to modify the first user program and the first setting information of the storage unit respectively using the second user program and the second setting information, and a control engine configured to execute the first user program using the first setting information. One control device of the plurality of control devices includes a security engine configured to manage security of the first setting information and the first user program for each of a plurality of the control devices including the one control device. The security engine includes a program verification unit configured to verify whether or not the first user program and the second user program satisfy program identity for each control device, an evaluation unit configured to evaluate validity of the setting indicated by the second setting information for each control device, and a modifying controller configured to permit or prohibit the modification of the modifying unit of the each control device, based on a verification result of the program verification unit and an evaluation of the evaluation unit.

In another example of the present disclosure, in a control system including a plurality of the control devices connected to a network, one control device of the plurality of control devices includes a module of the security engine for another control device.

In another example of the present disclosure, a management method for managing security of a control device is provided. The control device includes: a storage unit configured to store a first user program for control of a target and first setting information indicating a setting for the control; a reception unit configured to receive a second user program for the control of the target and second setting information indicating a setting for the control; and a control engine configured to execute the first user program using the first setting information. The management method includes: verifying whether or not the first user program and the second user program satisfy program identity; evaluating validity of the setting indicated by the second setting information; and determining whether or not the control device is caused to permit to perform modifying processing for modifying the first user program and the first setting information of the storage unit respectively using the second user program and the second setting information based on a verification result in the verifying and an evaluation in the evaluating.

According to another example of the above disclosure, when the first user program and the first setting information in the storage unit executed by the control engine are modified respectively using the received second user program and second setting information, it is possible to verify the identity of the first user program and the second user program, evaluate the validity of the setting indicated by the second setting information, and permit or prohibit the performance of the above modification based on the verification result and the evaluation.

Consequently, the prohibition or permission of the modifying of the first user program and the first setting information executed by the control engine can be controlled without requiring special input by the user. As a result, occurrence of an incident due to inappropriate falsification of the control program or the setting information can be avoided while the burden on the user is reduced, and the security of the control device can be secured.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a view schematically illustrating an aspect of the falsification of the control program of the embodiment.

FIG. 12 is a view schematically illustrating an aspect of the falsification of the control program of the embodiment.

FIG. 13 is a view schematically illustrating an aspect of the falsification of the control program of the embodiment.

DESCRIPTION OF THE PREFERRED EMBODIMENT

Figure 1:
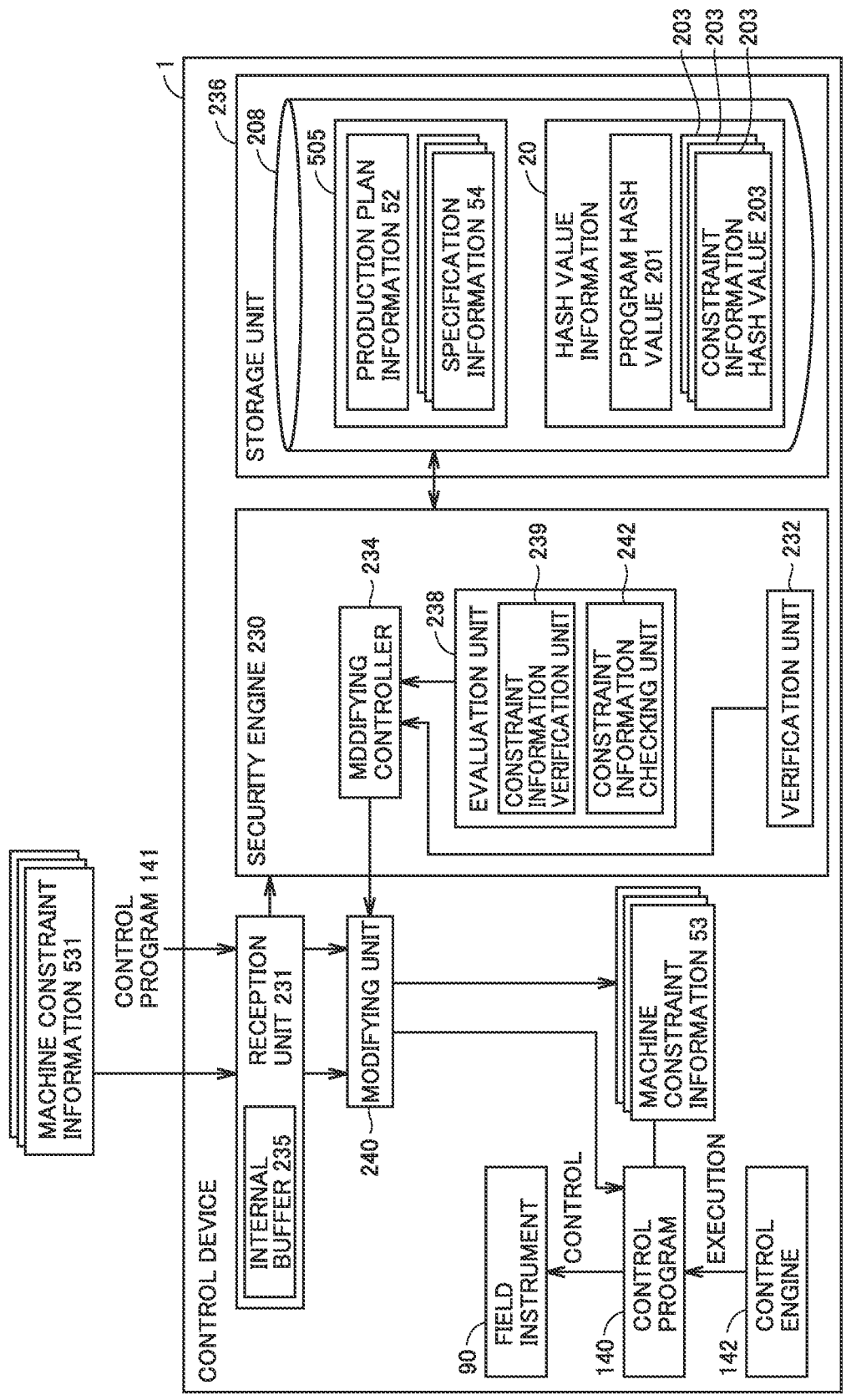
FIG. 1 is a view illustrating an example of a scene to which a control device 1 according to an embodiment is applied.

With reference to the drawings, an embodiment of the present invention will be described below. In the following description, the same parts and components are denoted by the same reference numeral. Those names and functions are the same. Thus, the detailed description thereof will not be repeated.

<A. Application Example>

With reference to FIG. 1, an example of a scene to which the present invention is applied will be described. FIG. 1 is a view illustrating an example of a scene to which a control device 1 according to an embodiment is applied. Control device 1 controls a field instrument 90 of a manufacturing facility or a production facility that is an example of a device of a control target by executing a user program including a stored control program using setting information including a control parameter.

In the embodiment, control device 1 can modify the stored user program and setting information using the user program and setting information that are received from an outside of control device 1. A concept of "modify" also means that changing a part or all of the user program to another content (program) or changing a part or all of the setting information to another content (setting information).

A maintenance person at the manufacturing site modifies the setting information based on the attribute of field instrument 90 of the actual machine provided in the manufacturing line according to the specification, and modifies the setting information stored in control device 1 using the modified setting information, such that the setting information is matched with the modification of the user program. In contrast, because a malicious person who is not a well-intentioned user such as the maintenance person cannot know the attribute or the specification of field instrument 90 of the actual machine, the setting information from the malicious person is information against the attribute or the specification. Based on such a background, control device 1 can evaluate the setting information received together with the user program and determine, based on the evaluation result, whether a modification of the stored user program is to be executed through a malicious falsification route or a bona fide falsification route.

More specifically, control device 1 verifies the identity of the user program between the stored user program and the user program received from the outside, and evaluates the setting information received together with the user program from the outside. Hereinafter, the identity of the user program is simply referred to as "program identity".

Based on the verification result of the program identity and the evaluation, control device 1 determines whether the modification of the stored user program using the user program received from the outside is permitted or prohibited, namely, performs what is called the determination of permission or prohibition. Thus, control device 1 can perform the determination of the permission or the prohibition without requesting the user to provide the identification data, the encryption rule, and the like.

With reference to FIG. 1, control device 1 includes a control engine 142 that executes a control program 140 using machine constraint information 53 corresponding to each field instrument 90, a security engine 230 that refers to information in a storage unit 236, a reception unit 231 having an internal buffer 235 that is a temporary storage area, and a modifying unit 240. Storage unit 236 includes a secondary storage device 208 described later, and stores various types of information including information 505 and hash value information 20 in secondary storage device 208. Information 505 includes production plan information 52 including a schedule including the type, the number of products, the production time (time from the start to the end of production), and the timing of the set-up change of the workpiece produced using an FA production line, and specification information 54 corresponding to each field instrument 90.

Machine constraint information 53 is an example of setting information including a control parameter of control program 140 that is an example of the user program and indicating the setting for the control. Machine constraint information 53 indicates a mechanical condition of corresponding field instrument 90. The condition can be indicated by a condition using a threshold (target value) for the attribute of field instrument 90. For example, the constraint condition indicates that the rotation amount (rotation speed, angle) of the motor based on the mechanical attribute of field instrument 90 does not exceed the threshold when field instrument 90 is a servo motor, or the constraint condition indicates that the target value of a heater temperature does not exceed the threshold when field instrument 90 is an instrument (heater or the like) on which proportional integral differential (PID) control is performed. The condition is not limited to the mechanical attribute, but may be a condition based on a physical attribute such as a friction coefficient or elasticity. At this point, a mechanical condition will be described.

Specification information 54 indicates a mechanical constraint condition of field instrument 90. The threshold for the mechanical attribute described above is set so as not to exceed a limit value such as an upper limit value or a lower limit value indicated by the mechanical constraint condition defined by specification information 54.

Hash value information 20 includes a program hash value 201 of control program 140 to be executed by control engine 142 and a constraint information hash value 203 of each piece of machine constraint information 53 used when control engine 142 executes control program 140. Because control program 140 or each piece of machine constraint information 53 is stored as binary data having an executable format in the control device 1, security engine 230 calculates a hash value from the binary data using a predetermined algorithm, and generates the hash value. The algorithm generating the hash value may be common or different between control program 140 and machine constraint information 53.

Modifying unit 240 performs modifying processing for modifying control program 140 and machine constraint information 53 corresponding to field instrument 90 respectively using control program 141 received by reception unit 231 and machine constraint information 531 of field instrument 90. The modifying processing can include processing for rewriting control program 140 and machine constraint information 53 respectively using control program 141 and machine constraint information 531 that are received by reception unit 231 or update processing for replacing control program 140 and machine constraint information 53 respectively with control program 141 and machine constraint information 531 that are received by the reception unit 231.

Control engine 142 executes control program 140 using for example, machine constraint information 53 as a control parameter. Thus, control engine 142 executes control program 140 before or after the modification using machine constraint information 53 before or after the modification corresponding to each field instrument 90, and controls field instrument 90 following an execution result.

In the embodiment, security engine 230 manages security of control program 140 executed by control engine 142 and at least one piece of machine constraint information 53 used for the control, thereby preventing occurrence of an incident for the control.

More specifically, security engine 230 includes a verification unit 232 that verifies the program identity between control program 140 and received control program 141, an evaluation unit 238 that evaluates validity of whether or not the setting of machine constraint information 531 received together with control program 141 is used for the control, and a modifying controller 234 that permits or prohibits modifying unit 240 from performing the modifying processing from the verification result of the program identity and the evaluation result of the validity.

Verification unit 232 collates program hash value 201 of control program 140 with a hash value generated from control program 141 received from the outside, and verifies the program identity from a collation result.

Evaluation unit 238 includes a constraint information verification unit 239 and a constraint information checking unit 242. Constraint information verification unit 239 collates stored constraint information hash value 203 with a hash value generated from externally-received machine constraint information 531, and verifies the identity between the two from the collation result. Constraint information checking unit 242 checks whether or not received machine constraint information 531 satisfies the constraint condition for the target control. More specifically, constraint information checking unit 242 compares the threshold for the condition indicated by machine constraint information 531 with the limit value of the constraint condition indicated by specification information 54. When a comparison result indicates that the threshold does not exceed the limit value of the constraint condition, constraint information checking unit 242 detects that the condition of the threshold set in machine constraint information 531 satisfies the constraint condition of specification information 54 and is valid as the setting used for the control, otherwise constraint information checking unit 242 detects that the condition is not valid. Evaluation unit 238 outputs that machine constraint information 531 is appropriate when constraint information verification unit 239 verifies the identity of the machine constraint information by matching the hash values of the two pieces of information, or when constraint information checking unit 242 detects that machine constraint information 531 is valid.

Modifying controller 234 determines whether to permit the performance of the modifying processing based on the verification result of the program identity of qverification unit 232 and the evaluation result of evaluation unit 238.

More specifically, (i) when constraint information verification unit 239 detects the identity of the machine constraint information while the program identity exists, modifying controller 234 outputs the permission command of the modifying processing to modifying unit 240, (ii) when constraint information checking unit 242 detects that machine constraint information 531 is valid while the program identity does not exist, modifying controller 234 outputs the permission command of the modifying processing to modifying unit 240, and (iii) when constraint information checking unit 242 does not detect that machine constraint information 531 is valid while the program identity does not exist, modifying controller 234 outputs the prohibition command of modification processing to modifying unit 240.

Furthermore, in the embodiment, the "falsification" may include the bona fide falsification and the malicious falsification. In order to determine the malicious falsification, control device 1 uses production plan information 52. Usually, in the manufacturing line at the site, the type or production amount of the workpiece is modified, the set-up change of the manufacturing line, or the like is performed according to the time indicated by time information about the schedule indicated by production plan information 52, and as a result, the model or the like of field instrument 90 provided in the manufacturing line is modified. When the model of field instrument 90 is modified, control program 140 or machine constraint information 53 of field instrument 90 is required to be modified according to the modification. A malicious person cannot know this schedule. Consequently, when receiving control program 141 or machine constraint information 531 from reception unit 231, control device 1 collates the received time with the schedule indicated by production plan information 52. When the collation result indicates that the received time is against the schedule, control device 1 can determine that there is a possibility of the malicious falsification.

In the embodiment, for example, "against the schedule" indicates the case where the time when control program 141 or machine constraint information 531 is received does not match the schedule indicated by production plan information 52. In addition, the case where the time matches the schedule indicated by production plan information 52 is referred to as "matching the schedule".

In the embodiment, the hash value generated according to a predetermined algorithm is used as the verification code of the identity of control program 141 or machine constraint information 53, but the present invention is not limited thereto. For example, a checksum value may be as such a verification code.

<B. Control System>

Figure 2:
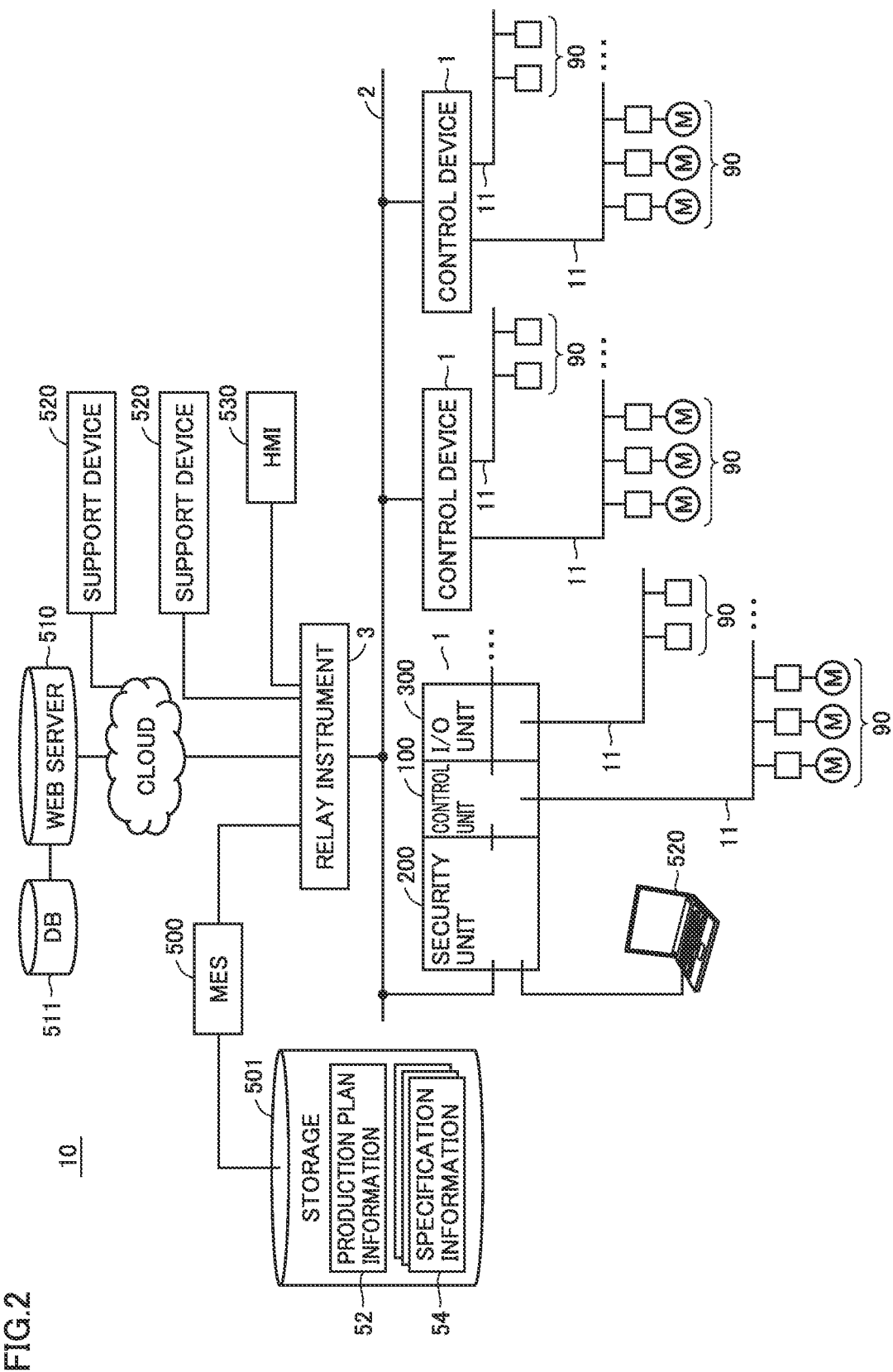
FIG. 2 is a schematic diagram illustrating an overall configuration of a control system 10 including the control device 1 of the embodiment.

FIG. 2 is a schematic diagram illustrating an overall configuration of control system 10 including control device 1 of the embodiment. With reference to FIG. 2, control system 10 includes at least one control device 1 connected to a network 2. For example, control system 10 is applied to a manufacturing line including a plurality of processes including a process of transporting the workpiece, a process of assembling the transported workpiece, a process of painting the assembled workpiece, and a process of checking the workpiece. Control system 10 constitutes a distributed control system including control device 1 for each process. Control device 1 in each process is connected to network 2 and exchanges data with each other. For example, network 2 is a network according to a communication standard such as EtherNet/IP (registered trademark) or object linking and embedding for process control unified architecture (OPC UA) that can implement data exchange without depending on a vendor or a type of an operating system (OS).

Control device 1 controls a control target. The control target includes various industrial instruments automating a production process, and includes a device that gives some physical action to a manufacturing device, a production line, or the like (hereinafter, also collectively referred to as a "field") and an input and output device that exchanges information with the field.

Control device 1 communicates with another information processing device through a relay instrument 3 connected to network 2. For example, another information processing device includes a manufacturing execution system (IVIES) 500 of the manufacturing execution system, a cloud-based web server 510, a support device 520, and an HMI device 530. IVIES 500 centrally monitors and manages the manufacturing line. MES 500 manages a schedule of set-up change of the manufacturing line, a schedule of the change of the type and the quantity of the workpiece to be produced, and the like. IVIES 500 stores production plan information 52, specification information 54, and the like linked to these schedules in a storage 501. Human machine interface (HMI) 530 can include a human machine interface (HMI) that presents various types of information obtained by control operation according to control program 140 in control device 1 to the operator and generates an internal command or the like to control device 1 according to the operation from the operator. Support device 520 provides a user interface (UI) tool for interactive conversation with each control device 1 of the manufacturing line, a UI tool developing a user program such as control program 140, a UI tool producing production plan information 52 or machine constraint information 53 of field instrument 90, and the like. Support device 520 can directly communicate with relay instrument 3, and also communicates with relay instrument 3 through a cloud environment. Support device 520 and HMI device 530 may be connected to network 2. Web server 510 stores and manages data collected and transferred by control system 10 in a data base (DB) 511. Storage unit 236 of each control device 1 stores production plan information 52 transferred from MES 500, and stores control program 141 or machine constraint information 531 about field instrument 90 transferred from MES 500, support device 520, or HMI device 530.

Control device 1 includes at least one device. In the example of FIG. 2, control device 1 includes a control unit 100, a security unit 200, and an input and output (I/O) unit 300. Control device 1 may include a power supply unit.

Control unit 100 is an example of the control device of the present invention, executes a user program such as control program 140 in order to control the control target, and executes main processing in control device 1. Control unit 100 constitutes a control engine 142 in FIG. 1.

Security unit 200 is an example of a security device constituting control device 1, and constitutes security engine 230 in FIG. 1. Support device 520 that can be configured of a portable type can be detachably connected to security unit 200.

Control unit 100 is connected to the security unit 200 through, for example, an arbitrary data transmission path (for example, PCI Express, EtherNet/IP (registered trademark), or the like).

I/O unit 300 is an example of a device constituting control device 1, and is a unit for general input and output processing. I/O unit 300 collects the detection value from the IO device including various sensors, various switches, encoders, and the like.

Control unit 100 is communicably connected to I/O unit 300 through an internal bus. Control unit 100 executes the operation of the control program using the detection value collected by I/O unit 300, and outputs the value of the arithmetic result to I/O unit 300.

Control unit 100 communicates with the plurality of field instruments 90 through field network 11. Control unit 100 collects a state value from the field instrument 90 through field network 11, executes control program 140 based on the collected state value, and outputs a control command as an execution result to field instrument 90 through field network 11. Field instrument 90 modifies the state value of the own device according to the control command.

Typically, various kinds of industrial Ethernet (registered trademark) can be used as field network 11. For example, EtherCAT (registered trademark) may be adopted as industrial Ethernet (registered trademark). Furthermore, a field network other than Industrial Ethernet (registered trademark) may be used.

The devices constituting control device 1 are not limited to the devices in FIG. 2. The device constituting control device 1 can include a special unit having a function not supported by I/O unit 300, a safety unit that provides a safety function for preventing the safety of a person from being threatened by a facility and a machine, and the like.

Control device 1 may be configured as the PLC or an industrial personal computer (what is called an IPC).

<C. Configuration of Control Device 1>

A hardware configuration example of a main device constituting control device 1 of the embodiment will be described.

(c1. Control Unit)

Figure 3:
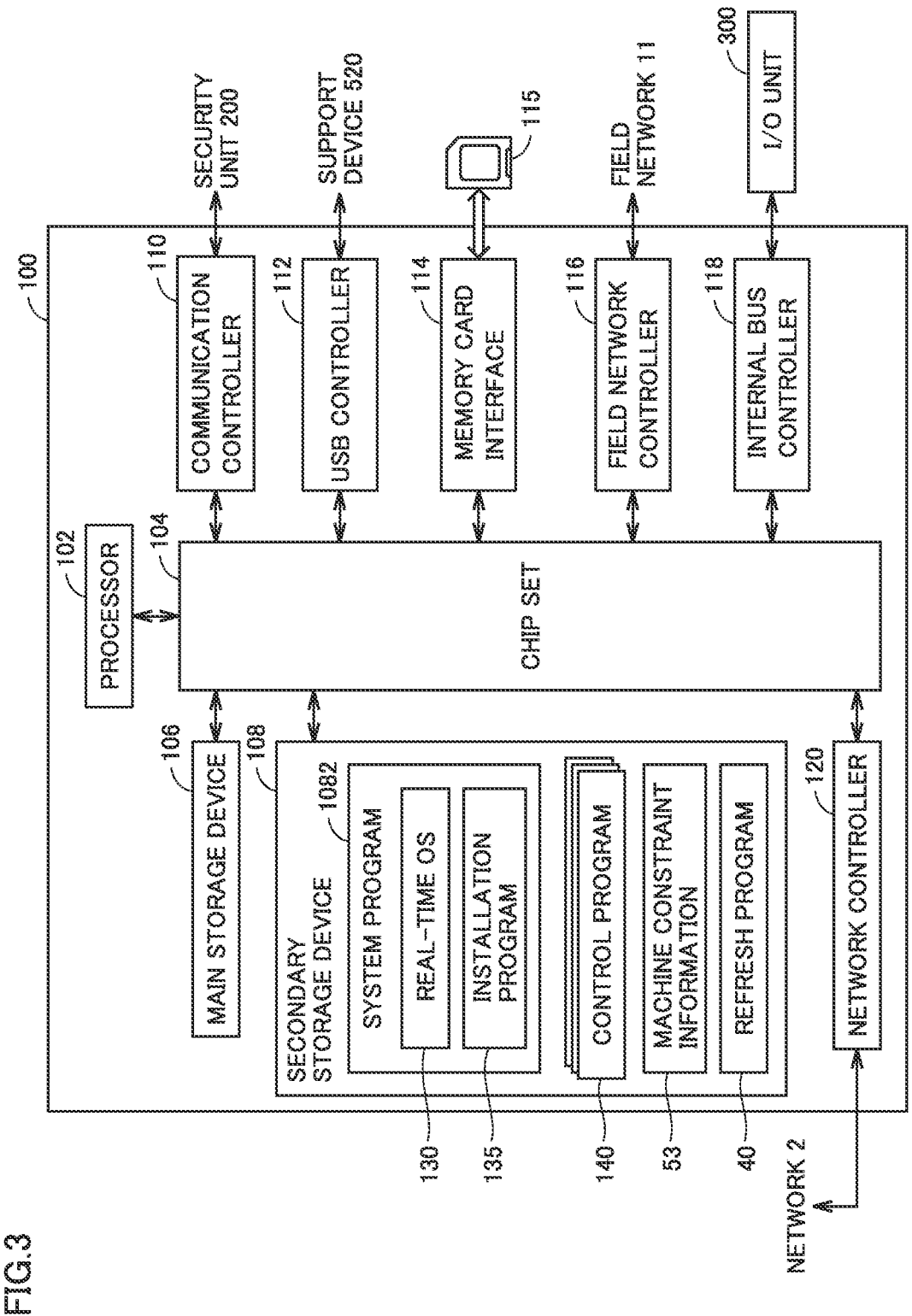
FIG. 3 is a schematic diagram illustrating a hardware configuration example of a control unit 100 constituting the control device 1 of the embodiment.

FIG. 3 is a schematic diagram illustrating a hardware configuration example of control unit 100 constituting control device 1 of the embodiment. With reference to FIG. 3, control unit 100 includes a processor 102 such as a central processing unit (CPU) or a graphical processing unit (GPU), a chip set 104, a main storage device 106, a secondary storage device 108, a communication controller 110, a universal serial bus (USB) controller 112, a memory card interface 114, a field network controller 116, an internal bus controller 118, and a network controller 120 as main components.

Processor 102 reads a user program including control program 140 stored in secondary storage device 108 or a memory card 115, deploys the user program in main storage device 106, and executes the deployed user program to control operation processing for controlling the control target.

Main storage device 106 is constructed with a dynamic random access memory (DRAM), a static random access memory (SRAM), or the like. Secondary storage device 108 is constructed with a nonvolatile storage device such as a hard disc drive (HDD) or a solid state drive (SSD).

Chipset 104 mediates the exchange of the data between processor 102 and each component, thereby implementing the processing of control unit 100 as a whole.

In addition to a system program 1082 including a real-time operating system (OS) 130 and an installation program 135 that implement the basic function of control unit 100, secondary storage device 108 stores a control program 140 produced according to the control target such as the facility or the machine, a refresh program 40 exchanging the control command and the state value described above with each field instrument 90, and machine constraint information 53 corresponding to each field instrument 90 of the control target. Control unit 100 repeatedly executes control program 140 and refresh program 40 at a predetermined cycle (for example, a control cycle) to periodically control field instrument 90. Control program 140 can be configured of an arbitrary control program executed by real-time OS 130. When real-time OS 130 provides the function of an interpreter, control program 140 may be stored in the form of a source code or an intermediate code, or stored in an executable state such as an object format. Although refresh program 40 can constitute the user program together with control program 140, in the embodiment, refresh program 40 is not included in a checking target of the falsification by security unit 200 in order to simplify the description. System program 1082 provides the function as control engine 142 that executes control program 140 under real-time OS 130.

Communication controller 110 is in charge of the data exchange with another unit. For example, a communication chip compatible with PCI Express, Ethernet (registered trademark), or the like can be adopted as communication controller 110. When security unit 200 that implements security engine 230 is externally attached to control device 1, another unit described above includes externally-attached security unit 200.

USB controller 112 is in charge of the data exchange with any information processing device through the USB connection. For example, the arbitrary information processing device includes support device 520 or HMI device 530 that provides functions such as production or editing of control program 140, debugging, and setting of various parameters to the user.

In memory card interface 114, memory card 115 that is an example of a recording medium is configured to be detachable. Memory card interface 114 can write the data such as control program 140 and various settings in memory card 115, and read the data such as control program 140 and various settings from memory card 115.

Field network controller 116 controls the data exchange with another device including field instrument 90 through field network 11.

Internal bus controller 118 controls the data exchange with another device (I/O unit 300 and the like) through the internal bus. For the internal bus, a communication protocol unique to a manufacturer may be used, or a communication protocol that is the same as or compliant with any of industrial network protocols may be used.

Network controller 120 controls the data exchange with another control device 1 or relay instrument 3 through network 2.

Although the configuration example in which required functions are provided by processor 102 executing the program has been described in FIG. 3, some or all of these provided functions may be implemented using a dedicated hardware circuit (for example, an application specific integrated circuit (ASIC) and a field-programmable gate array (FPGA)). Alternatively, the main part of control unit 100 may be implemented using hardware (for example, an industrial personal computer based on a general-purpose personal computer) according to a general-purpose architecture. In this case, processing may be executed in parallel by applying a multi-core technology. Alternatively, the plurality of OSs having different uses may be executed in parallel using a virtualization technology, and the required application may be executed on each OS.

(c2. Security Unit)

Figure 4:
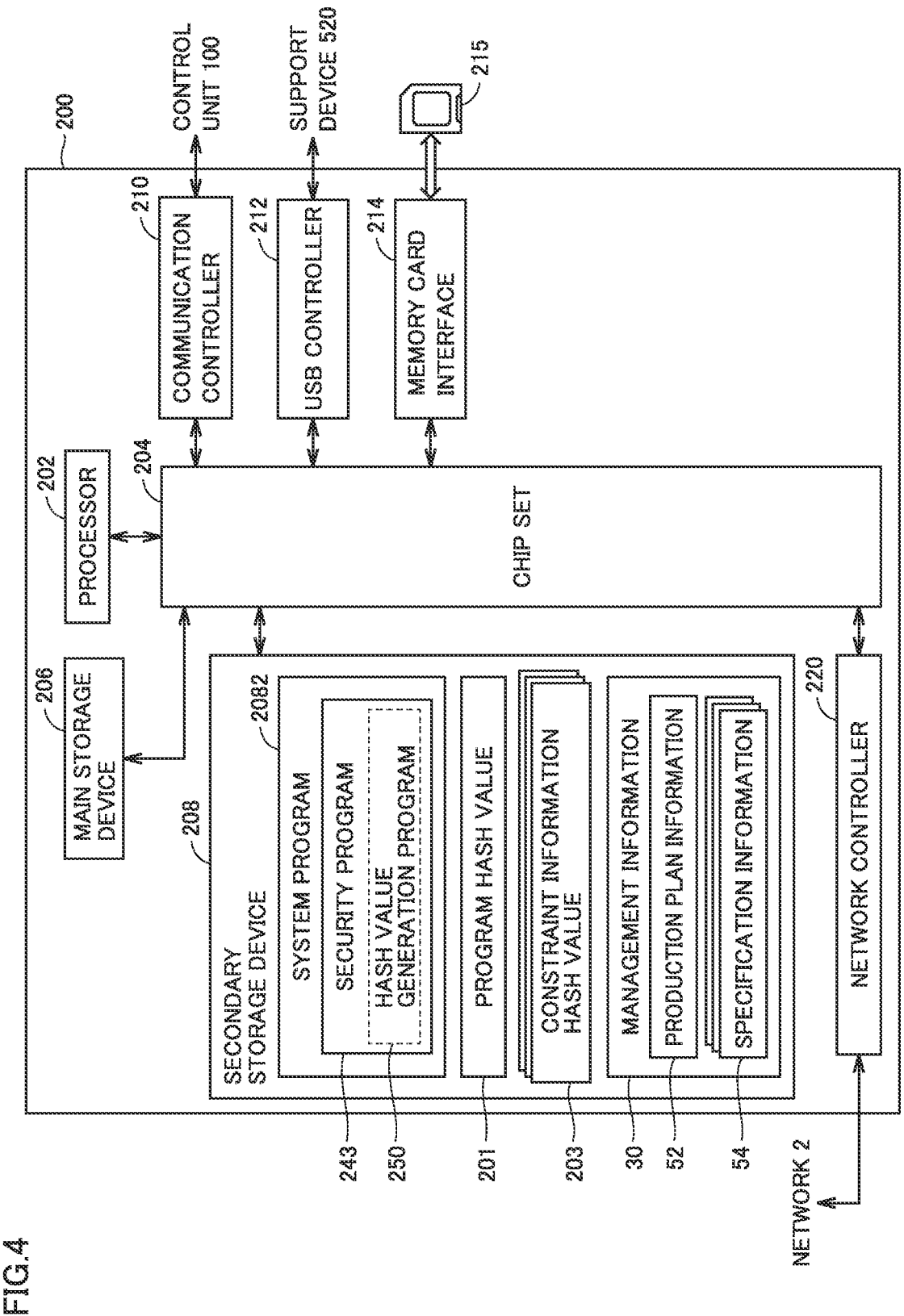
FIG. 4 is a schematic diagram illustrating a hardware configuration example of a security unit 200 constituting the control device 1 of the embodiment.

FIG. 4 is a schematic diagram illustrating a hardware configuration example of security unit 200 constituting control device 1 of the embodiment. With reference to FIG. 4, security unit 200 includes a processor 202 such as the CPU or the GPU, a chip set 204, a main storage device 206, a secondary storage device 208, a communication controller 210, a USB controller 212, a memory card interface 214, and a network controller 220 as main components.

Processor 202 reads various programs stored in secondary storage device 208 or a memory card 215, deploys the various programs in main storage device 206, and executes the various programs to implement a security module for control device 1. Main storage device 206 is configured of a volatile storage device such as a DRAM or an SRAM. For example, secondary storage device 208 is configured of a non-volatile storage device such as an HDD or an SSD.

Chip set 204 mediates the data exchange between processor 202 and each component, thereby implementing the processing of security unit 200 as a whole.

Secondary storage device 208 stores the hash value information and management information 30 in addition to a system program 2082 such as an OS implementing the basic function of security unit 200.

A security program 243 having a hash value generation program 250 is incorporated in system program 2082. Security program 243 is a program managing the security for control device 1, and is executed by security engine 230. Hash value generation program 250 generates program hash value 201 of control program 140 and constraint information hash value 203 corresponding to each piece of machine constraint information 53 according to a predetermined algorithm. In security unit 200, the OS provides the function of security engine 230 that executes security program 243.

Management information 30 includes production plan information 52 transferred from IVIES 500 and specification information 54 about each field instrument 90.

Communication controller 210 is in charge of the data exchange between security unit 200 and control unit 100. Similarly to communication controller 110 of control unit 100, for example, the communication chip corresponding to PCI Express, Ethernet (registered trademark), or the like can be adopted as communication controller 210.

USB controller 212 is in charge of the data exchange with any information processing device through the USB connection. For example, the arbitrary information processing device includes support device 520 or HMI device 530.

Support device 520 or HMI device 530 provides a function such as setting of security program 243 to the user.

Memory card interface 214 is configured to be detachably attach memory card 215 that is an example of a storage medium. Memory card interface 214 can write the data such as the program and various settings in memory card 215, or read the data such as the program and various settings from memory card 215.

Network controller 220 controls the data exchange with various devices including another control device 1 through network 2. Network controller 220 may adopt a general-purpose network protocol such as Ethernet (registered trademark).

Although the configuration example in which the required functions are provided by processor 202 executing the program has been illustrated in FIG. 4, some or all of these provided functions may be mounted using a dedicated hardware circuit (for example, ASIC or FPGA). Alternatively, the main part of security unit 200 may be implemented using hardware (for example, an industrial personal computer based on a general-purpose personal computer) according to a general-purpose architecture. In this case, processor 202 may be configured of a multiple core, and execute the applications in parallel. In this case, security unit 200 may execute the plurality of OSs having different uses in parallel using a virtualization technology, and execute the required application on each OS.

In FIGS. 3 and 4, control device 1 may be connected to network 2 through network controller 120 of control unit 100, or connected to network 2 through network controller 220 of security unit 200. In the embodiment, it is assumed that control device 1 is connected through network controller 220 of security unit 200.

<D. Configuration of Support Device 520>

Figure 5:
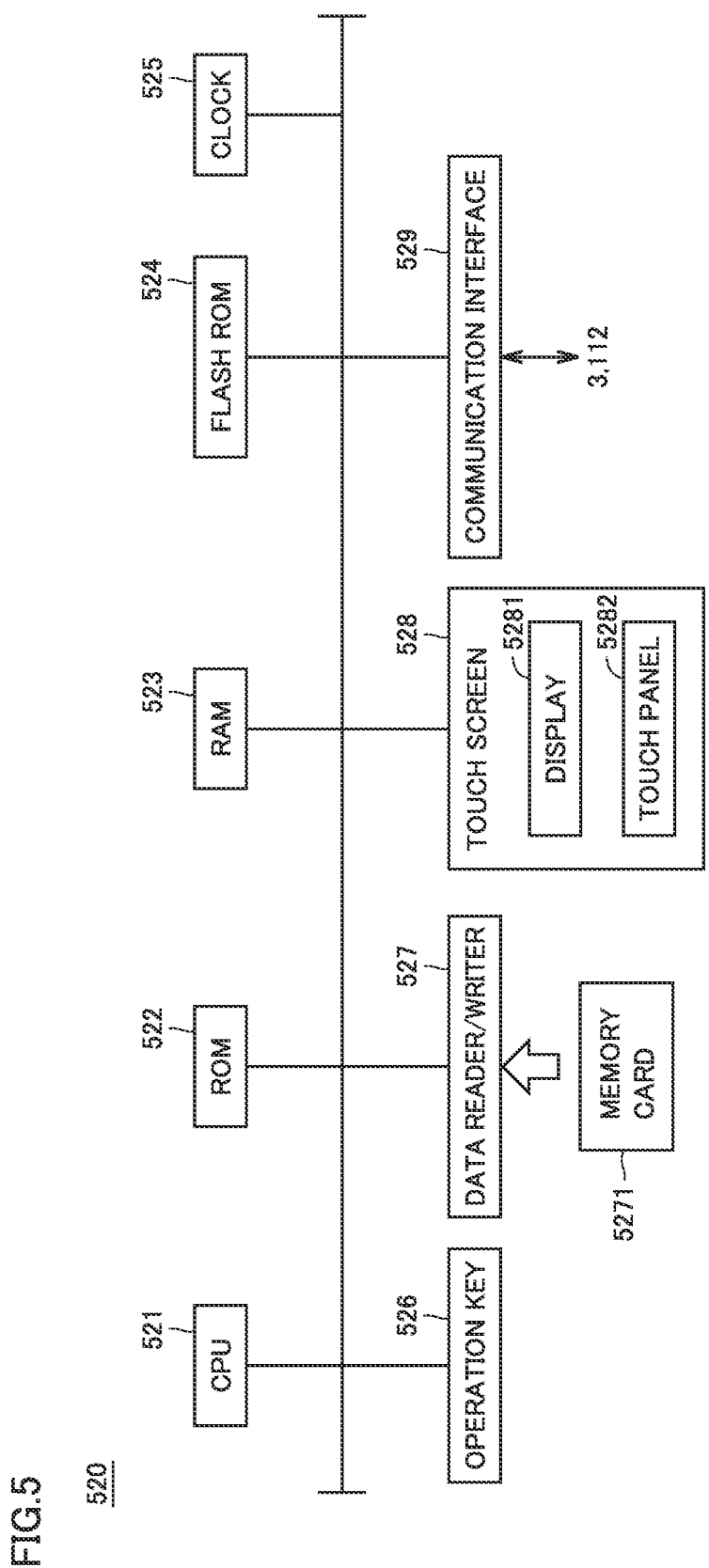
FIG. 5 is a view schematically illustrating a hardware configuration of a support device 520 of the embodiment.

FIG. 5 is a view schematically illustrating a hardware configuration of support device 520 of the embodiment. With reference to FIG. 5, support device 520 includes a CPU 521, a read only memory (ROM) 522, a random access memory (RAM) 523, a flash ROM 524 storing various programs and data in a nonvolatile manner, a clock 525, an operation key 526 receiving the operation of the user, a data reader and writer 527, a touch screen 528, and a communication interface 529. These units are connected to each other through an internal bus.

Touch screen 528 includes a display 5281 and a touch panel 5282 receiving input of the operator. Communication interface 529 controls the communication between support device 520 and relay instrument 3 or USB controller 122. Data reader and writer 527 mediates data transmission between CPU 521 and a memory card 5271 that is an external storage medium. HMI device 530 also has a configuration similar to support device 520.

<E. Transfer of Setting Information>

Figure 6:
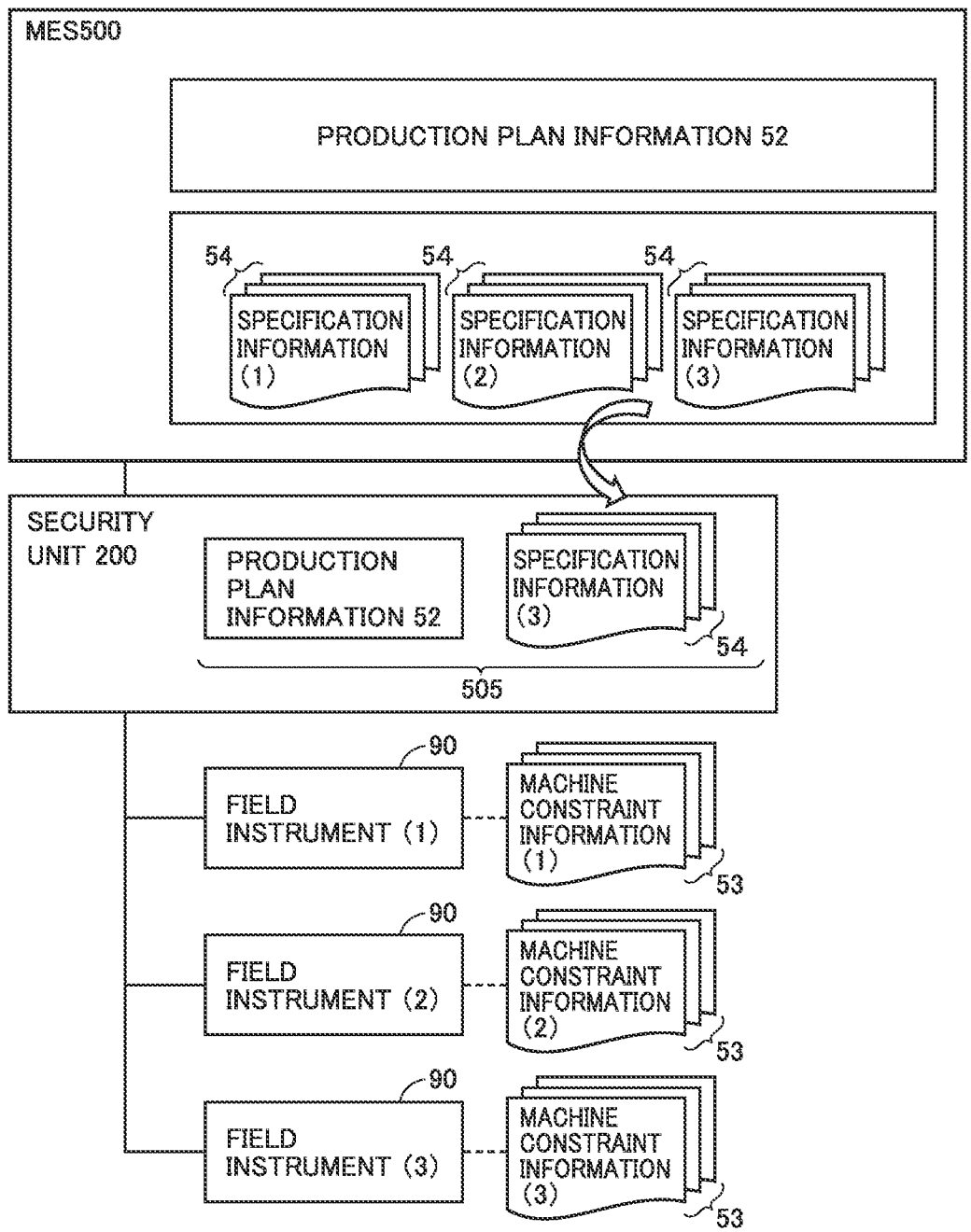
FIG. 6 is a view illustrating a relationship between production plan information and machine constraint information of the embodiment.

FIG. 6 is a view illustrating a relationship between the production plan information and the machine constraint information of the embodiment. In the embodiment, IVIES 500 stores production plan information 52 and specification information 54 of each field instrument 90 in storage 511. IVIES 500 transfers production plan information 52 and specification information 54 to security unit 200 of control device 1. Control device 1 controls field instrument 90 by executing control program 140 using machine constraint information 53 of each field instrument 90. In FIG. 6, machine constraint information (1), machine constraint information (2), and machine constraint information (3) are illustrated for each field instrument 90.

For example, machine constraint information 53 and control program 140 are generated by the user operation in HMI device 530 or support device 520, and transferred to control device 1 through network 2, and reception unit 231 receives transferred machine constraint information 53 and control program 140. The route through which machine constraint information 53 and control program 140 are transferred from the external device to control device 1 is not limited to the route through network 2. For example, the route through USB controller 112 or the route from memory cards 115, 215 through memory card interfaces 114, 214 may be used.

<F. Outline of Processing>

Figure 7:
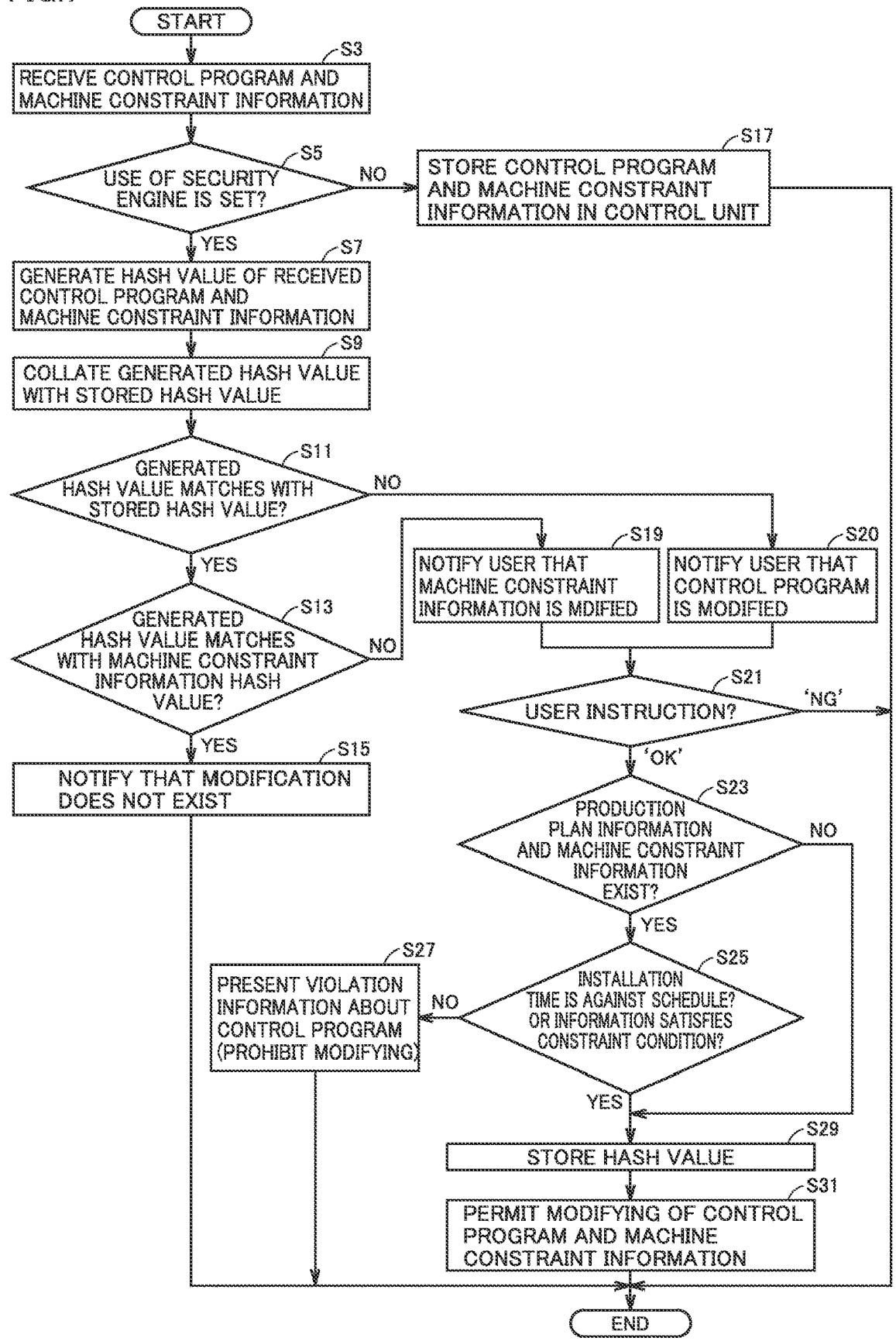
FIG. 7 is a schematic flowchart illustrating installation processing of a control program 140 and machine constraint information 53 of the embodiment.

Processing for installing control program 140 and machine constraint information 53 in control device 1 will be described. FIG. 7 is a schematic flowchart illustrating installation processing of control program 140 and machine constraint information 53 of the embodiment. FIG. 7 illustrates a scene in which control program 141 and machine constraint information 531 corresponding to each field instrument 90 are transferred from HMI device 530 to control device 1, installation program 135 is executed, and transferred control program 141 and machine constraint information 531 are installed in control device 1. In the installation of the embodiment, reception unit 231 receives control program 141 and machine constraint information 531 of each field instrument 90 that are transferred from the external device, and storage unit 236 converts received control program 141 and machine constraint information 531 into an executable format and stores converted control program 141 and machine constraint information 531 in a predetermined area of secondary storage device 108. Storage unit 236 and modifying unit 240 are implemented by executing installation program 135.

Referring to FIG. 7, processor 202 of security unit 200 receives control program 141 and machine constraint information 531 of each field instrument 90 transferred from HMI device 530 as reception unit 231, and temporarily stores control program 141 and machine constraint information 531 in internal buffer 235 (step S3).

Processor 202 determines whether or not the use of security engine 230 is set in control device 1 based on the set parameter (step S5). When it is determined that the use is not set (NO in step S5), storage unit 236 reads control program 141 and machine constraint information 531 of each field instrument 90 that are stored in internal buffer 235, and stores control program 141 and machine constraint information 531 in secondary storage device 108 (step S17). Thus, secondary storage device 108 stores control program 141 and machine constraint information 531 of each field instrument 90 in an executable format as control program 140 and machine constraint information 53 of each field instrument 90, respectively. At this point, processor 202 generates program hash value 201 of stored control program 140 and constraint information hash value 203 of each piece of machine constraint information 53, and stores program hash value 201 and constraint information hash value 203 in secondary storage device 208.

When determining that the use of security engine 230 is set in control device 1 (YES in step S5), processor 202 activates security engine 230.

When security engine 230 is activated, processor 202 converts control program 141 and each piece of machine constraint information 531 that are stored in internal buffer 235 into an executable format as verification unit 232, and generates the program hash value and the constraint information hash value for converted control program 141 and each piece of machine constraint information 531 (step S7), respectively. Processor 202 compares the generated hash value with the hash value stored in secondary storage device 208 (step S9).

More specifically, processor 202, as verification unit 232, collates the generated program hash value with stored program hash value 201, and determines whether or not the generated program hash value and stored program hash value 201 match with each other based on the collation result (step S11). When determining that the generated program hash value and stored program hash value 201 match with each other (YES in step S11), processor 202 collates the constraint information hash value generated from machine constraint information 531 corresponding to each field instrument 90 with constraint information hash value 203 of stored machine constraint information 53 of field instrument 90 as constraint information verification unit 239, and determines whether or not the generated constraint information hash value and constraint information hash value 203 match with each other based on the collation result (step S13). When determining that the generated constraint information hash value and constraint information hash value 203 match with each other (YES in step S13), processor 202 outputs notification indicating that control program 140 and machine constraint information 53 are not modified to the user (step S15). At this point, processor 202, as modifying controller 234, may output the permission command permitting the performance of the modifying processing based on the output of verification unit 232 and the output of constraint information verification unit 239, and cause modifying unit 240 to perform the modifying processing.

On the other hand, when determining that the generated program hash value does not match with program hash value 201 (NO in step S11), processor 202 outputs the notification indicating that control program 140 is modified to the user (step S20), and the processing proceeds to step S21. When determining that the generated constraint information hash value does not match with stored constraint information hash value 203 for machine constraint information 531 of any of the field instruments 90 (NO in step S13), processor 202 outputs the notification indicating that machine constraint information 53 is modified to the user (step S19), and the processing proceeds to step S21. These notifications are output to a display or the like through, for example, HMI device 530 or support device 520. When the user operates HMI device 530 or support device 520 to input an instruction of whether or not control program 140 or machine constraint information 53 is modified, HMI device 530 or support device 520 transfer the instruction based on the user operation to control device 1.

Processor 202 determines whether the modification performance of control program 140 or machine constraint information 53 is permitted (OK) or not (NG) based on the user instruction from HMI device 530 or support device 520 (step S21). The processing ends when NG of the modification is input ("NG" in step S21), but the processing proceeds to step S23 when OK of the modification is input ("OK" in step S21).

Processor 202 determines whether or not production plan information 52 and machine constraint information 53 of each field instrument 90 are stored in secondary storage device 208 (step S23). When processor 202 determines that these pieces of information are not stored (NO in step S23), the processing proceeds to step S29. On the other hand, when determining that these pieces of information are stored (YES in step S23), processor 202 determines whether or not the installation time is against the schedule of production plan information 52 or whether or not the information to be installed satisfies constraint condition of the specification information 54 (step S25).

More specifically, processor 202 collates the time of the current installation with the schedule of production plan information 52, and determines whether or not the installation time matches with the schedule based on the collation result (step S25). When determining that the installation timing is against the schedule (NO in step S25), processor 202 transfers violation information indicating that the modification of control program 140 is performed against the schedule to HMI device 530 or support device 520, and presents (outputs) the violation information to the user through HMI device 530 or support device 520 (step S27). Alternatively, processor 202, as constraint information checking unit 242, collates the condition such as the threshold of each piece of machine constraint information 531 with the constraint condition of specification information 54, and determines whether or not the condition such as the threshold is not against the constraint condition of the specification based on the collation result (step S25). For example, processor 202 determines whether or not the threshold of machine constraint information 531 exceeds a limit value of the constraint condition of specification information 54.

When determining that machine constraint information 531 is against the constraint condition of specification information 54 because the threshold of the condition exceeds the limit value (NO in step S25), processor 202 transfers the violation information indicating that the modification of control program 140 is performed while being against the specification to HMI device 530 or support device 520, and presents (outputs) the violation information to the user through HMI device 530 or support device 520 (step S27).

On the other hand, when determining that the installation timing matches with the schedule of production plan information 52 and that the constraint condition of machine constraint information 531 matches with specification information 54 (YES in step S25), processor 202 outputs the modification permission command to modifying unit 240 as modifying controller 234.

According to the modification permission command, processor 202 modifies (rewrites) program hash value 201 and each constraint information hash value 203 to secondary storage device 208 using the hash value of control program 141 and the hash value of each machine constraint information 531 that are already calculated in step S7. Thus, the hash value of control program 141 and the hash value of each piece of machine constraint information 531 are stored in secondary storage device 208 as hash value information 20 (step S29).

According to the modification permission command, processor 102, as modifying unit 240, performs the modifying processing on control program 141 and each piece of machine constraint information 531 of secondary storage device 108 using control program 140 and each piece of machine constraint information 53 of each field instrument 90 (step S31).

Thus, when control device 1 receives control program 141 (control program 141 in which the program hash values do not match) falsified from the outside during the installation, security unit 200 checks machine constraint information 531 received together with control program 141 based on specification information 54, and evaluates whether or not the setting of the condition such as the threshold indicated by machine constraint information 531 of field instrument 90 is valid for the control of field instrument 90 from the checking result. When the setting of the condition is evaluated as valid, security unit 200 permits control device 1 to install control program 141 and machine constraint information 531 as control program 140 and machine constraint information 53.

<G. Aspects of Falsify>

FIGS. 8 to 13 are views schematically illustrating an aspect of the falsification of the control program of the embodiment. The falsification indicates that the above modifying processing is performed, and for example, includes the installation. In addition, the falsification includes the falsification by a person in good faith and the falsification by a person in maliciousness.

Figure 8:
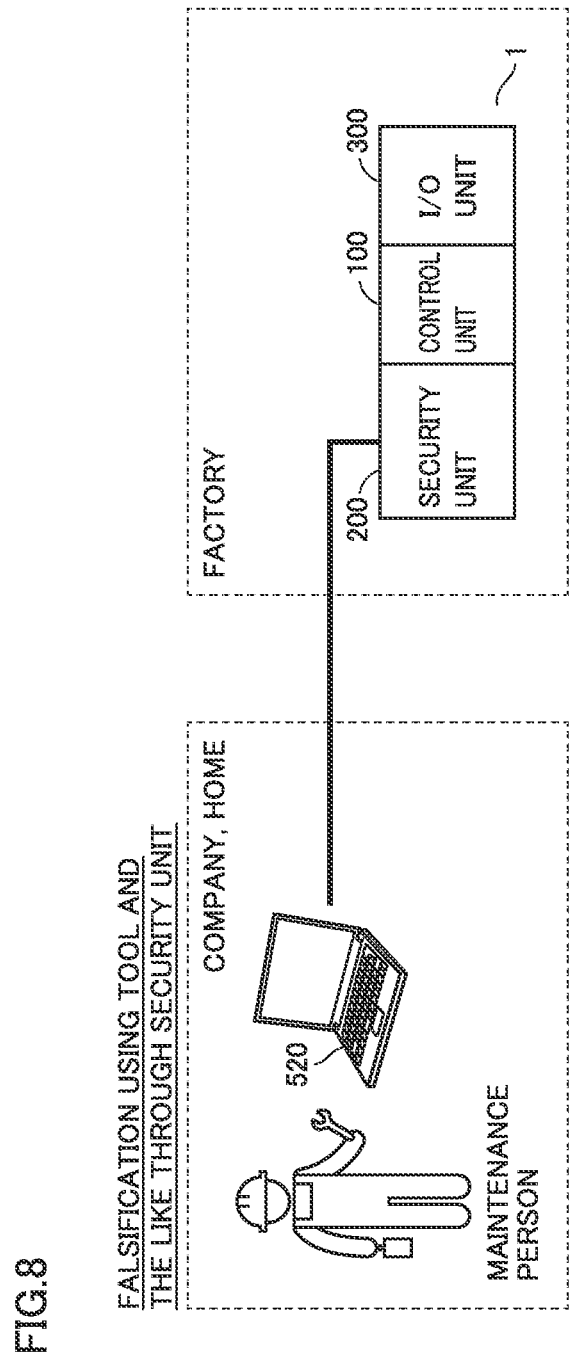
FIG. 8 is a view schematically illustrating an aspect of falsification of the control program of the embodiment.
Figure 9:
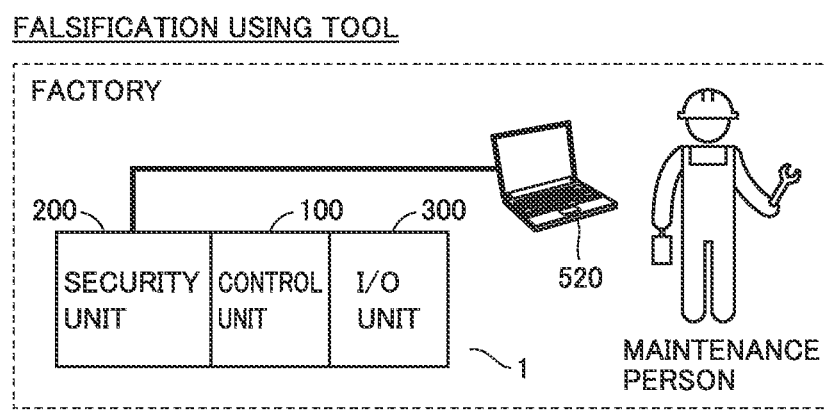
FIG. 9 is a view schematically illustrating an aspect of the falsification of the control program of the embodiment.
Figure 10:
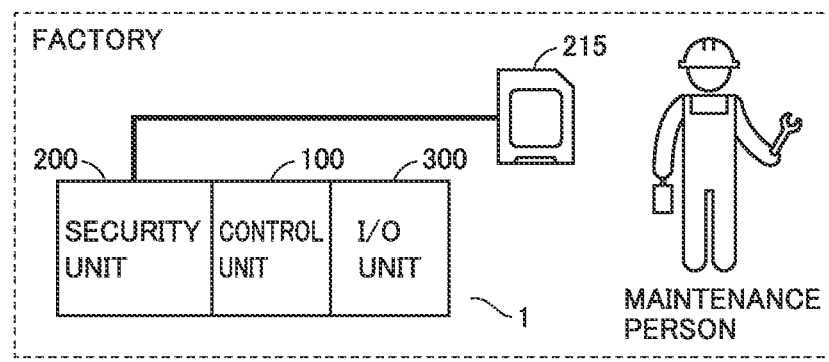
FIG. 10 is a view schematically illustrating an aspect of the falsification of the control program of the embodiment.

FIG. 8 illustrates the case where the maintenance person operates support device 520 using the UI tool at a company or at home, thereby falsifying control program 140 of control device 1 from support device 520 through the cloud, relay instrument 3, and network 2. In contrast, FIGS. 9 and 10 illustrate the case where a maintenance person in a factory falsifies control program 140 of control device 1, and illustrate the case where the maintenance person falsifies control program 140 of control device 1 by operating the support device 520 connected to the control device 1 through the USB connection (see FIG. 9) or by attaching memory card 215 storing the control program to control device 1 (see FIG. 10).

FIGS. 11 and 12 illustrate the case where the modifying processing of machine constraint information 53 is performed by replacing field instrument 90 according to the adjustment of the manufacturing line during the set-up change. When the maintenance person operates support device 520 to produce and install machine constraint information 531 on the field instrument 90 after replacement, FIG. 11 illustrates the case where security engine 230 determines that machine constraint information 531 satisfies the constraint condition (condition such as a limit value) of specification information 54. In contrast, FIG. 12 illustrates the case where security engine 230 determines that machine constraint information 531 does not satisfy the constraint condition of specification information 54 due to a setting error by the maintenance person.

FIG. 13 illustrates the case where a malicious person intends to install machine constraint information 531 together with control program 140 for the purpose of destroying the manufacturing line. In this case, the malicious person sets an abnormal value, namely, a value exceeding the limit value indicated by the constraint condition of specification information 54 to the threshold indicated by the condition of machine constraint information 531. Security engine 230 determines that machine constraint information 531 does not satisfy the constraint condition of specification information 54, and outputs a prohibition command prohibiting the performance of the modifying processing to modifying unit 240.

In addition, in the case of FIG. 11, after the modifying processing is performed, control device 1 is activated so as to execute control program 140 using machine constraint information 531 after the installation. However, in the cases of FIGS. 12 and 13, it is detected that an abnormal value is set to the threshold of the condition of machine constraint information 53, the performance of the modifying processing is prohibited, and control device 1 is not activated.

<H. Modifications>

In the above embodiment, the following modifications can be applied.

(h1. First Modification)

In control system 10 of FIG. 2, one control devices 1 of the plurality of control devices 1 may perform the function of security engine 230 for another control device 1. In this case, one control device 1 performs the verification based on the hash value information about each of control program 140 and machine constraint information 53 and checks machine constraint information 53 for another control device 1, and transfers the permission or prohibition command of the performance of the modifying processing to another control device 1 based on the results of the verification and the checking. Specifically, the one control device 1 receives a first user program (control program 140), a second user program (control program 141), second setting information (machine constraint information 531), and a constraint condition (specification information 54) from another control device 1. The one control device 1 includes a security engine configured to manage security of the first setting information (machine constraint information 53) and the first user program (control program 140) for each of a plurality of the control devices including the one control device 1. The security engine includes a program verification unit configured to verify whether or not the first user program (control program 140) and the second user program (control program 141) satisfy program identity for each control device 1, an evaluation unit configured to evaluate validity of the setting indicated by the second setting information (machine constraint information 531) for each control device 1, and a modifying controller configured to transfers the permission or prohibition command of the performance of the modifying processing, based on a verification result of the program verification unit and an evaluation of the evaluation unit, to the modifying unit of each control device 1.

In the modification, the evaluation unit further configured to check whether or not the second setting information (machine constraint information 531) of each control device 1 satisfies the constraint condition (specification information 54) for the control of the target corresponding to the control device 1.

(h2. Second Modification)

In the above embodiment, security engine 230 is configured to be provided in security unit 200 that is the unit independent of control unit 100. However, the present disclosure is not limited to this configuration. For example, security engine 230 may have a configuration in which security engine 230 is built in control unit 100. In this case, both security engine 230 and control engine 142 are supported in control unit 100.

(h3. Third Modification)

In the above embodiment, security engine 230 is activated when control program 141 is installed. However, security engine 230 may be activated when control program 141 is downloaded. Alternatively, security engine 230 may be activated at the timing when control device 1 is activated.

<I. Program>

Processor 202 of security unit 200 implements a security module for executing the program of secondary storage device 208, detecting inappropriate falsification of control program 140 and machine constraint information 53, and making the notification.

The security module is mainly implemented by executing security program 243, and such a program and data may be downloaded from an external device to secondary storage device 208. More specifically, the program and data may be downloaded from memory card 215 through memory card interface 214, downloaded from the external device connected to network 2 through network controller 220, or downloaded from support device 520 or HMI device 530 through USB controller 212. Memory card 215 is a medium that accumulates, in a non-transitory manner, information such as the program by electrical, magnetic, optical, mechanical, or chemical action such that a computer, other devices, a machine, or the like can read the information such as the recorded program.

The program can be executed by at least one processor circuit such as a CPU, or a combination of the processor circuit and a circuit such as an application specific integrated circuit (ASIC) or a field-programmable gate array (FPGA).

In addition, at least a part of the program may be configured by a circuit such as ASIC or FPGA.

In still another example of the present disclosure, a non-transitory storage medium having stored thereon a program causing a computer to execute the management method is provided.

According to another example of the above disclosure, when the first user program and the first setting information in the storage unit executed by the control engine are modified respectively using the received second user program and second setting information, it is possible to verify the identity of the first user program and the second user program, evaluate the validity of the setting indicated by the second setting information, and permit or prohibit the performance of the above modification from the verification result and the evaluation.

Consequently, the prohibition or permission of the modifying of the first user program and the first setting information executed by the control engine can be controlled without requiring special input by the user. As a result, the occurrence of an incident due to inappropriate falsification of the control program or the setting information can be avoided while the burden on the user is reduced, and the security of the control device can be secured.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device comprising:
a storage device configured to store a first user program for control of a target and first setting information indicating a setting for the control;
control processing circuitry configured to at least:
receive a second user program for the control of the target and second setting information indicating the setting for the control;
modify the first user program and the first setting information of the storage device respectively using the second user program and the second setting information;
execute the first user program using the first setting information; and
security processing circuitry configured to manage security of the first setting information and the first user program, the security processing circuitry being configured to at least:
verify whether or not the first user program and the second user program satisfy program identity;
evaluate validity of the setting indicated by the second setting information; and
permit or prohibit performance of the modifying of the control processing circuitry based on a verification result and the validity that is evaluated,
wherein the security processing circuitry permits the modification of the first user program using the second user program when the verification result indicates that the program identity is not satisfied.

2. The control device according to claim 1, wherein the security processing circuitry is configured to check whether or not the second setting information satisfies a constraint condition for the control of the target.

3. The control device according to claim 2, wherein the security processing circuitry verifies whether or not the first setting information and the second setting information satisfy information identity, and
wherein the validity of the setting is evaluated based on a verification result of the information identify and a checking result of the checking.

4. The control device according to claim 2, wherein the second setting information includes a threshold for the control of the target, and
wherein the security processing circuitry checks by comparing the threshold of the second setting information with a predetermined value indicated by the constraint condition.

5. The control device according to claim 1, wherein the permission or prohibition of the performance of the modifying is further based on time information indicated by production plan information including a set-up change time of a manufacturing line including the target.

6. The control device according to claim 5, wherein, when the second control program and the second setting information are received, the control processing circuitry determines whether or not a received time of the second control program and the second setting information matches the schedule indicated by production plan information and permits the modification when the received time matches the schedule.

7. The control device according to claim 1, wherein the security processing circuitry generates a program verification code verifying an identity of each of the first user program and the second user program, and verifies the identity based on collation between the program verification codes.

8. The control device according to claim 7, wherein the program verification code includes hash values each generated from the first user program and the second user program.

9. The control device according to claim 8, wherein the hash value generated from the second user program is stored as a hash value of the modified first user program when the modification is performed.

10. The control device according to claim 1,
wherein the control processing circuitry is independent of the security processing circuitry.

11. A control system comprising a plurality of control devices connected to a network, each control device comprising:
a storage device configured to store a first user program for control of a target and first setting information indicating a setting for the control;
control processing circuitry configured to at least:
a receive a second user program for the control of the target and second setting information indicating the setting for the control;
modify the first user program and the first setting information of the storage device respectively using the second user program and the second setting information; and
execute the first user program using the first setting information,
one control device of the plurality of control devices further comprising security processing circuitry configured to manage security of the first setting information and the first user program for each of the plurality of control devices, the security processing circuitry configured to at least:
verify whether or not the first user program and the second user program satisfy program identity for each control device;
evaluate validity of the setting indicated by the second setting information for each control device; and
permit or prohibit a performance of the modification of by the each control device, based on a verification result and the validity that is evaluated,
wherein the security processing circuitry permits the modification of the first user program using the second user program when the verification result indicates that the program identity is not satisfied.

12. A management method for managing security of a control device, the control device including:
a storage device configured to store a first user program for control of a target and first setting information indicating a setting for the control;
processing circuitry configured to at least:
a receive a second user program for the control of the target and second setting information indicating a setting for the control; and
execute the first user program using the first setting information,
the management method comprising:
verifying whether or not the first user program and the second user program satisfy program identity;
evaluating validity of the setting indicated by the second setting information; and
determining whether or not the control device is caused to permit to perform modifying processing for modifying the first user program and the first setting information of the storage device respectively using the second user program and the second setting information based on a verification result in the verifying and an evaluation in the evaluating, wherein the management method permits the control device to modify the first user program using the second user program when the verification result indicates that the program identity is not satisfied.

13. The control device according to claim 1, wherein the security processing circuitry prohibits the modification of the first user program using the second user program when the verification result indicates that the program identity is satisfied.

\* \* \* \* \*